Feb. 8, 1944.  E. R. PFEIFFER ET AL  2,340,983
POWER TAKE OFF UNLOADING ATTACHMENT
Filed May 23, 1942  3 Sheets-Sheet 1
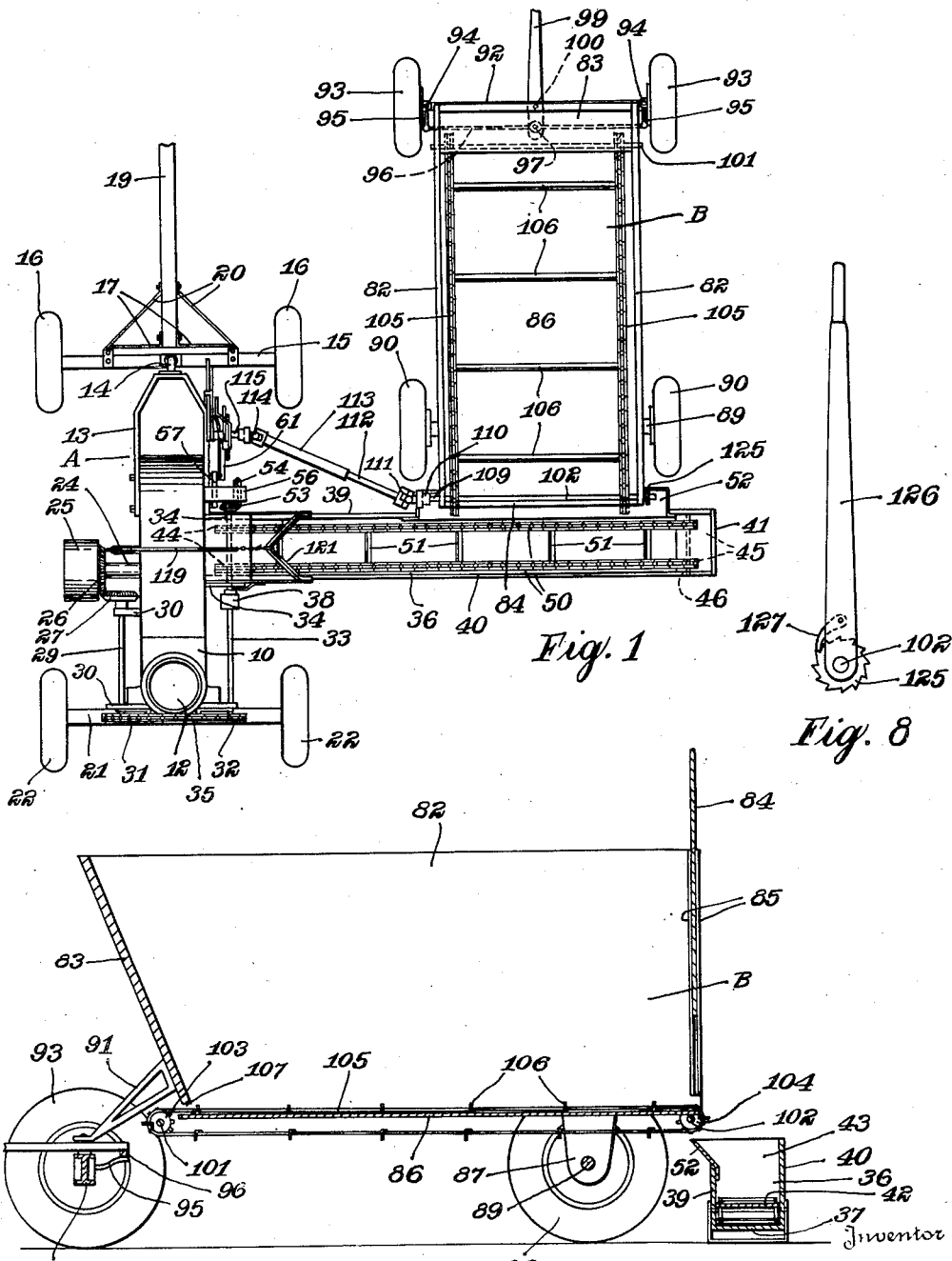
Inventor
Elmer R. Pfeiffer
Edmond A. Sodem
Fred Pfeiffer
By Robert M. Dunning  Attorney Inventors
Elmer R. Pfeiffer
Edmond A. Sodem
Fred Pfeiffer
By Robert M. Dunning  Attorney Feb. 8, 1944.  E. R. PFEIFFER ET AL  2,340,983
POWER TAKE OFF UNLOADING ATTACHMENT
Filed May 23, 1942  3 Sheets-Sheet 3

Inventor
Elmer R. Pfeiffer
Edmund A. Sodem
Fred Pfeiffer
By Robert M. Dunning Attorney

UNITED STATES PATENT OFFICE 2,340,983

POWER TAKE-OFF UNLOADING ATTACHMENT

Elmer R. Pfeiffer, Sherman Township, Redwood County, and Edmond A. Sodem and Fred Pfeiffer, Morton, Minn.

Application May 23, 1942, Serial No. 444,246

5 Claims. (Cl. 214—83)

Our invention relates to an improvement in power take-off unloading attachment, wherein it is desired to provide a means for unloading a vehicle.

The object of the present invention is to decrease the amount of labor and time in the unloading of vehicles. To accomplish this aim, we provide in the vehicle a novel type of unloading device which could be used for unloading materials into a blower, elevator, bin, or on the ground. In order to explain the principles of our invention we have shown the unloading device attached to a blower. The same unloading device could be used for a variety of purposes too numerous to mention, and with various other types of equipment.

The following description deals particularly with an unloading device used in conjunction with a blower. It should be understood that other equipment could similarly be used in conjunction with our unloading device. We have found our unloading device of considerable advantage in conjunction with a blower, such as may be used for ensilage, and have described this combination in detail. In this use the vehicle unloading device may be connected to the blower so that the entire operation may be accomplished automatically. This feature is of extreme importance at the present time in view of the scarcity of farm labor, for with this device a single workman can unload ensilage or the like and blow the same into a silo, bin, or to any other desired point.

It is the object of the present invention to equip a vehicle body with an unloading device, which preferably comprises a pair of endless chains operating over the floor of the vehicle body and having a series of paddles or blades extending between the chains so as to force the ensilage rearwardly along the floor of the vehicle body. When used in conjunction with a blower, a means is provided for connecting the sprockets supporting the chains to the blower so that as the blower operates the wagon unloading device also operates to unload the contents of the vehicle into the hopper which feeds the blower.

A feature of the present invention lies in the provision of a means of manually varying the speed of operation of the vehicle unloading device in relation to the ability of the blower, elevator, or other equipment to take the material away. Our device is so arranged that the speed of unloading the vehicle may be increased or decreased in order to properly feed the blower, elevator, or other equipment.

A further feature of the present invention lies in the provision of a device which is fully automatic in operation once it has been connected up. In order to operate the device, it is only necessary to move the vehicle into position to feed into the hopper of the blower or elevator, and to connect the sprocket shaft of the unloading chains to the variable speed mechanism operated in conjunction with the blower, elevator, or other device. This may be done while the blower or elevator is in motion.

A feature of the present invention lies in the provision of an unloading means which may be operated manually, if it is so desired. Our variable speed mechanism connecting the blower, or elevator to the vehicle is so arranged that the vehicle may be unloaded manually, if it is so desired. Our device is so arranged that although the automatic feed ordinarily operates relatively slowly, manual operation may take place more quickly when it is desirable or necessary.

These and other objects and novel features of our invention will be more clearly and fully set forth in the following specification and claims.

In the drawings forming a part of our specification:

Figure 1 is a diagrammatic top plan view illustrating the ensilage blower, the hopper for feeding material into the same, the variable speed mechanism driven by the blower, the wagon, trailer, or truck equipped with our unloading device, and the connection between the unloading device and the variable speed mechanism.

Figure 2 is a diagrammatic vertical section through the wagon or trailer showing our unloading device applied thereto.

Figure 8 is a side view of the manual unloading means.

Figure 3:
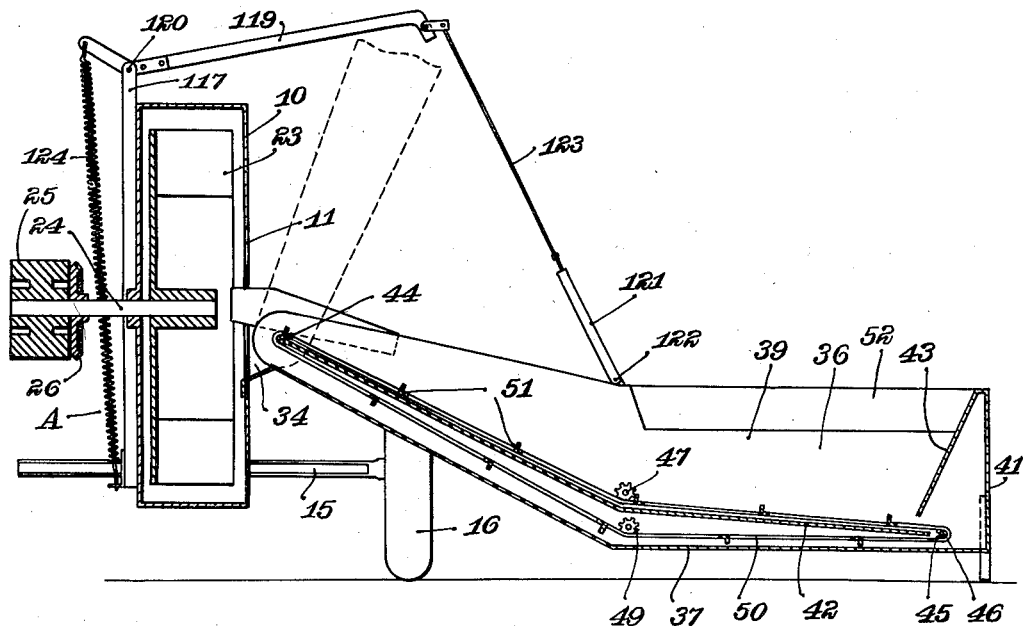
Figure 3 is a diagrammatic section taken on a vertical plane through the hopper and ensilage blower showing the relative relationship of the parts thereof.

The ensilage blower may be of any desired or preferred type and is illustrated in the drawings in general by the letter A. The blower A includes a spiral casing 10 having a central inlet opening 11 illustrated in Figure 3 of the drawings, and an outlet 12 into which is connected a series of tubular sleeves through which the ensilage is blown into the silo. A substantially U-shaped frame 13 projects forwardly from the blower casing 10 and is connected through the pivotal support 14 to the front axle 15 of the device. The front axle 15 is supported by spaced wheels 16. The axle 15 is pivotally connected to a pair of bracket arms 17 to which is connected the wagon or trailer tongue or draw bar 19. Braces 20 support and strengthen this connection.

The rear end of the blower casing is supported by the axle 21 which rotatably supports the rear wheels 22. Thus the blower is entirely portable and may be moved about from one position to another.

A blower such as 23 is mounted within the casing 10 and is rotatably supported upon a shaft 24. The shaft 24 is provided with a pulley 25 through which power may be supplied to operate the blower. A bevel gear 26 is also mounted upon the shaft 24, which gear cooperates with a second bevel gear 27 enclosed on the shaft 29 extending longitudinally of the blower casing. The shaft 29 is supported by suitable supports 30 secured to the casing 10 and the rear end of the shaft 29 supports a sprocket 31. An aligned sprocket 32 is mounted upon a parallel shaft 33 which extends longitudinally of the blower casing 10 and which extends through flanges 34 secured to the wall of the blower casing 10. A chain 35 connects the sprockets 31 and 32 so that the shaft 29 acts to drive the shaft 33. A clutch 38 is provided in the shaft 33, to permit operation of the blower independently of the hopper conveyor and of the variable speed mechanism.

An elongated trough-shaped hopper 36 is pivotally supportd upon the shaft 33. This hopper 36 is designed to receive the ensilage from the wagon or trailer and to convey the same into the blower. The hopper 36 includes a bottom 37, and side walls 39 and 40, as well as an end wall 41. As best seen in Figure 3 of the drawings, a false bottom 42 is provided, and a false end wall 43 is also provided so as to support the ensilage.

A pair of sprockets 44 are mounted upon the shaft 33 in spaced relation. Aligned sprockets 45 are provided on a shaft 46 extending transversely through the hopper 36 near the end thereof. Idle sprockets 47 and 49 are provided within the hopper so as to change the direction of the chains 50 which operate between the aligned sprockets. Transversely extending blades or pusher bars 51 connect the chains 50 and act to push the ensilage along the false bottom 42 and into the blower casing 10. An inclined lip 52 extends from the side 39 of the hopper to guide the ensilage into the hopper 36.

Figure 6:
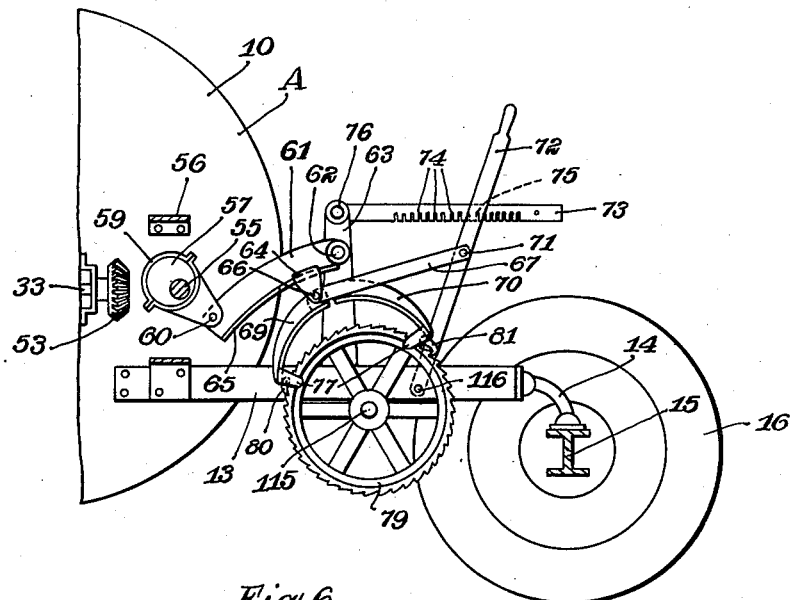
Figure 6 is a side elevational view of the variable speed mechanism showing the eccentric for operating the same.
Figure 7:
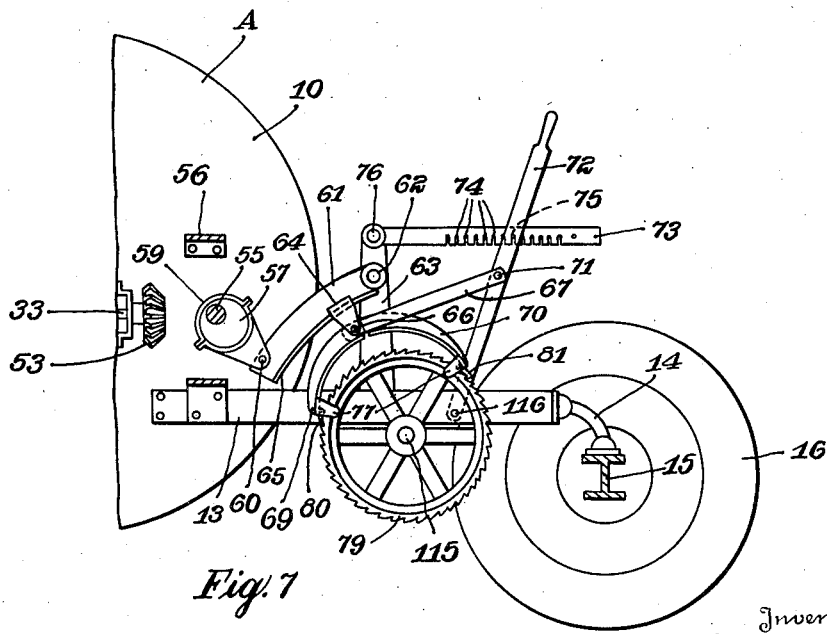
Figure 7 is a view similar to Figure 6 showing the parts in a slightly different relation.

A beveled gear 53 is mounted upon the shaft 33 and engages a cooperable bevel gear 54 on a shaft 55 parallel to the blower shaft 24 and supported between the blower casing 10 and a bracket 56. Mounted on the shaft 55 we provide an eccentric 57, best illustrated in Figures 1, 6, and 7 of the drawings. An eccentric strap 59 encircles the eccentric and is pivotally connected at 60 to an arcuated slide guide 61. The slide guide 61 is pivotally mounted at 62 to an upright support 63 secured to the frame member 13. A slide 64 which is movable longitudinally of the slide guide 61 and which engages the flange 65 thereof is pivotally connected at 66 to link means 67 and also to a pair of pawl arms 69 and 70.

Figure 5:
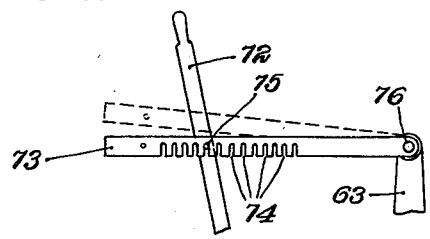
Figure 5 is a detailed view of the speed varying device and the variable speed mechanism.
Figure 4:
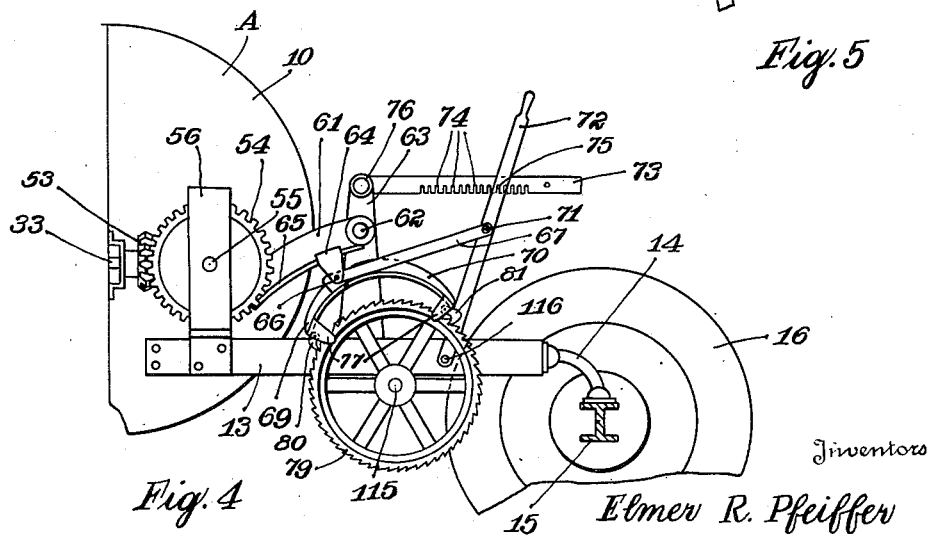
Figure 4 is a side elevational view of the variable speed mechanism for driving the unloading device.

The link means 67 is pivoted at 71 to a lever 72 which is held in set position by an adjustment bar 73. The adjustment bar 73 is provided with a series of spaced slots 74 therein which are engageable with a pin 75 on the handle 72. The bar 73 is pivotally connected at 76 to the upright standard 63 and may be raised, as illustrated in dotted outline in Figure 5 of the drawings, if the operating handle 72 is to be shifted from one position to another.

The pawl arms 69 and 70 are provided with ears 77 which engage the rim of the ratchet wheel 79 and double acting pawls 80 and 81 are pivotally connected to their respective arms 69 and 70. These pawls act to advance the ratchet wheel 79 a step at a time and the amount of advancement depends to some extent upon the position of the operating lever 72. The amount of movement of the pawl arms 69 and 70 depends upon the position of the slide 64 with respect to its arcuated slide guide 61. Obviously, as the slide 64 is pushed more closely adjacent the pivot 62 the movement of the pawl arms 69 and 70 will decrease. Similarly by swinging the lever 72 in a counter-clockwise direction so that the slide 64 is positioned at a considerable distance from the pivot 62 the movement of the pawl arms 69 and 70 will be materially increased.

The wagon or trailer used in conjunction with the ensilage blower is illustrated in Figures 1 and 2 of the drawings. This wagon or trailer may be of any suitable type and is shown including spaced parallel sides 82 and inclined forward wall 83, and a removable rear wall 84. The rear wall 84 is shown vertically slidable between a slide guide 85, although in usual practice any suitable means may be provided for supporting this rear wall. A floor 86 is provided on the wagon or trailer onto to which the ensilage is piled.

Suitable supporting brackets 87 project downwardly from the wagon to support the rear axle 89 upon which are rotatably supported the rear wheels 90. Suitable brackets 91 may also be provided for supporting the front axle 92 which supports the front wheels 93. The wheels 93 are shown pivotally attached at 94 to the front axle 92 and arms 95 may be connected by a suitable tie rod 96, which may be pivotally secured at 97 to the rear end of the tongue or draw bar 99. This tongue or draw bar 99 is pivotally secured to the front axle at 100. Thus pivotal movement of the draw bar will act to pivotally move the front wheels 93. Obviously, the entire axle 92 may be pivotally supported to the wagon or trailer if it is so desired.

A pair of sprocket shafts 101 and 102 extend transversely of the wagon B and support sprockets in spaced relation. The shaft 101 supports spaced sprockets 103, while the rear shaft 102 supports spaced sprockets 104 which are in alignment with the sprockets 103. Spaced parallel chains 105 extend over the sprockets 103 and 104.

Paddles or blades 106 are secured between the chains 105 so as to push the ensilage toward the rear end of the wagon along the floor 86. The sprockets are so positioned that the upper portion of the chain extends over the floor 86 and returns beneath this floor 86, the blades or paddles 106 entering the wagon through a slot 107 in the forward wall 83.

The shaft 102 is provided with a laterally projecting end 109 which is squared to receive the socket end 110 of a universal joint 111. A squared shaft 112 extends from the universal joint 111 and extends into a squared recess or socket within the sleeve 113. The universal joint 114 connects the socket sleeve 113 to the shaft 115 of the ratchet wheel 79.

The hopper 36 is pivotally supported to the blower so that this hopper may be raised during movement of the blower from place to place. In order to assist in the operation of the hopper I provide an upright supporting means 117 secured to the blower casing 10 which supports a lever 119 intermediate its ends at the pivot point 120. A yoke 121 pivoted to the hopper 36 at 122 is connected by the flexible connecting means 123 to one end of the lever 119, and a spring 124 is connected to the other end of the lever 119. This spring 124 is anchored to the blower casing 10 and acts to counterbalance the weight of the hopper 36 to facilitate the pivoting of the same into the dotted outline position illustrated in Figure 3 of the drawings.

In operation the wagon B is filled with ensilage and is backed up to the hopper 36 so that the rear end of the wagon will feed into the hopper. The connecting means is then extended between the shaft 115 of the sprocket wheel 79 and the sprocket shaft 102, the shaft 112 sliding in the socket 113 to compensate for any variation in length between these elements. The pulley 25 is then connected by a belt to a source of supply of power, such as to the take off sheel of a tractor and the blower is started. The blower is started by rotation of the pulley 25.

As the pulley 25 is rotated the fan 23 within the casing 10 is rotated, acting to blow ensilage through the outlet 12 and through any desired series of tubular connectors into the silo or other suitable place. Simultaneously, power is transmitted through the bevel gears 26 and 27, the shaft 29, a chain 35 and the shaft 33 and to the spaced chains 50 within the hopper 36. These chains 50 draw ensilage along the hopper and into the blower casing 10. The clutch 38 permits independent operation of the blower when desired.

Simultaneously, power is transmitted through the beveled gears 53 and 54 to the shaft 55 to operate the eccentric 57. This action swings the slide guide 61 about its center 62. The slide 64 mounted on the slide guide is swung toward and away from the ratchet wheel 79. This action pivots the ratchet arms 69 and 70, acting to spread these arms apart and to pull the same together. During this movement the pawls 80 and 81 engage the teeth of the ratchet 79 to advance the ratchet wheel. By adjustment of the position of the lever 72, the position of the slide 64 on the guide 61 may be adjusted so that the slide 64 will travel through a greater or lesser degree of movement as is desired. Obviously the greater the movement of the slide 64 toward and away from the ratchet wheel 79, the greater will be the movement of this ratchet for each rotation of the blower shaft.

Movement is transmitted from the ratchet wheel 79 to its shaft 115 and this shaft 115 transmits movement through the universal joints 111 and 114, through the squared shaft 112 and its socket 113 and through the socket 110 to the sprocket shaft 102. Thus as the blower operates the ensilage is pushed toward the rear of the trailer or wagon by means of the paddles or blades 108 which force the ensilage into the hopper 36.

When it is desired to unload the vehicle manually, means are provided so that this result can be accomplished. A ratchet 125 is provided upon the shaft 102. A lever 126 is pivoted on the shaft 102, and may, if desired, be removed therefrom. A pawl 127 is provided on the lever 126 which is engageable with the ratchet 125 to rotate the shaft 102 on which the ratchet is mounted. This direct rotative force will quickly unload the vehicle if manual unloading is desirable. Furthermore, the lever 126 may be used to supplement the automatic operation, to speed up the automatic operation, and to smooth out irregularities in the unloading.

In accordance with the patent statutes, we have described the principles of construction and operation of our power take-off unloading attachment, and while we have endeavored to set forth the best embodiments thereof, we desire to have it understood that obvious changes may be made within the scope of the following claims without departing from the spirit of our invention.

We claim:

1. In combination, a conveying mechanism, a vehicle for containing material to be conveyed, an unloading device on said vehicle, and intermittently operable variable speed mechanism connecting said conveying device to said unloading device for operating said unloading device.

2. In combination, a conveying mechanism, a means for operating said conveying device, a vehicle, an unloading device for said vehicle including a pair of longitudinally extending chains in said vehicle, sprocket means supporting said chains, paddles connecting said chains for pushing the material to be blown from said vehicle, and intermittently operable variable speed mechanism connecting said conveying device to said sprockets for operating the same.

3. In combination, a blower, means for operating said blower, means for feeding material into said blower, means connecting said blower and said feeding means to operate the same in unison, a vehicle for carrying material to be blown, an unloading device in said vehicle comprising an endless conveyor, and intermittently operable means for connecting said conveyor to said blower for operating the same in unison, said connecting means including a variable speed device.

4. In combination a conveying mechanism, a vehicle for containing material to be conveyed, an unloading device on said vehicle, means connecting said conveying device to said unloading device for intermittently operating said unloading device, and means in said connecting means for varying the speed of said intermittently operable unlocking device.

5. In combination a conveying mechanism, a means for operating said conveying mechanism, a vehicle for containing material to be conveyed, an unloading device on said vehicle, and means connecting said conveying device to said unloading device for operating said unloading device, said means including means for converting continuous movement to intermittent movement to drive said unloading device intermittently, said last named means including means for varying the speed of said unloading device.

ELMER R. PFEIFFER
EDMOND A. SODEM.
FRED PFEIFFER.